US006678410B1

(12) United States Patent
Phinney et al.

(10) Patent No.: US 6,678,410 B1
(45) Date of Patent: Jan. 13, 2004

(54) GENERATING A GLYPH

(75) Inventors: Thomas W. Phinney, San Jose, CA (US); Jeremy A. Hall, San Jose, CA (US)

(73) Assignee: Adobe Systems Incorporated, San Jose, CA (US)

(*) Notice: Subject to any disclaimer, the term of this patent is extended or adjusted under 35 U.S.C. 154(b) by 0 days.

(21) Appl. No.: 09/251,700

(22) Filed: Feb. 17, 1999

(51) Int. Cl.[7] .................................................. G06K 9/00
(52) U.S. Cl. ........................ 382/181; 345/171; 345/469; 345/471; 382/184; 382/187; 715/542
(58) Field of Search .................................. 345/170, 467, 345/468, 469–471, 171; 382/181–187, 226–229, 233; 715/542

(56) References Cited

U.S. PATENT DOCUMENTS

| | | | |
|---|---|---|---|
| 4,933,866 A | 6/1990 | Markoff et al. | 345/471 |
| 5,185,818 A | 2/1993 | Warnock | |
| 5,263,132 A | 11/1993 | Parker et al. | 707/542 |
| 5,473,743 A | 12/1995 | Watanabe | 345/471 |
| 5,577,177 A | 11/1996 | Collins et al. | 345/469 |
| 5,586,241 A * | 12/1996 | Bauermeister et al. | 345/467 |
| 5,666,478 A | 9/1997 | Nashikawa | 345/468 |
| 5,710,880 A * | 1/1998 | Howlett et al. | 345/468 |
| 5,771,034 A * | 6/1998 | Gibson | 345/141 |
| 5,771,035 A | 6/1998 | Imaki et al. | 345/143 |
| 5,859,648 A | 1/1999 | Moore et al. | 345/471 |
| 5,949,435 A | 9/1999 | Brock et al. | 345/468 |
| 5,959,635 A | 9/1999 | Watanabe et al. | 345/469 |
| 6,073,148 A | 6/2000 | Rowe et al. | 707/542 |
| 6,141,002 A * | 10/2000 | Kannungo et al. | 345/327 |
| 6,151,032 A | 11/2000 | Cheng | 345/469 |
| 6,175,372 B1 * | 1/2001 | Ballard et al. | 345/470 |
| 6,178,263 B1 * | 1/2001 | Fan et al. | 382/198 |
| 6,404,435 B1 * | 6/2002 | Miller et al. | 345/468 |
| 6,421,055 B1 * | 7/2002 | Jones et al. | 345/471 |
| 6,476,925 B2 * | 11/2002 | Nguyen et al. | 358/1.13 |

FOREIGN PATENT DOCUMENTS

| | | |
|---|---|---|
| EP | 0 661 670 A2 | 7/1995 |
| WO | 94/24623 | 10/1994 |
| WO | 94/29782 | 12/1994 |

OTHER PUBLICATIONS

Microsoft Corporation, "Microsoft Computer Dictionary," Fourth Edition, pp. 191, ©1999.
Whatis.com, retrieved from www.archive.org (www.whatis.com), "Glyph", Jan. 1998.

* cited by examiner

Primary Examiner—Bhavesh M. Mehta
Assistant Examiner—Gregory Desire
(74) Attorney, Agent, or Firm—Fish & Richardson P.C.

(57) ABSTRACT

A computer-implemented method of generating a glyph in which a plurality of design characteristics are extracted from a target font and a source glyph program is generated using the design characteristics. The source glyph program defines a new glyph that corresponds to a character that is not present in the target font, e.g., the Euro, and is stylistically similar to glyphs of the target font. The new glyph may be added to the target font, it may be rendered on an output device, or it may be saved separately from the target font.

81 Claims, 6 Drawing Sheets

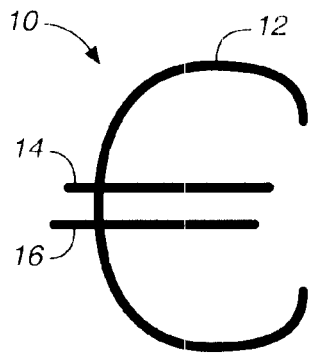
FIG._1A
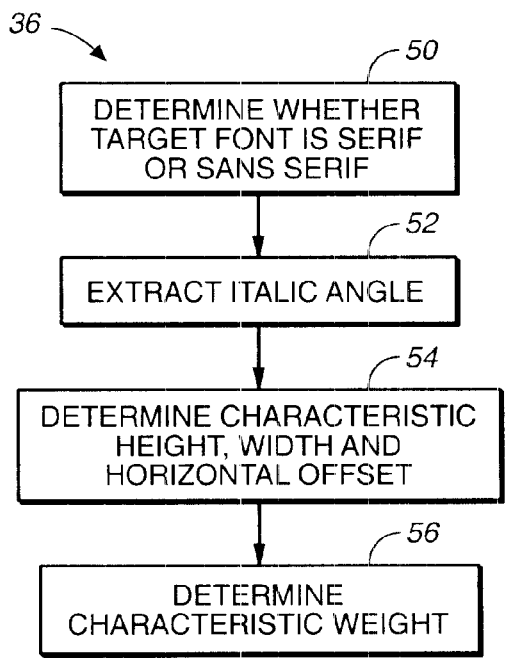
FIG._3
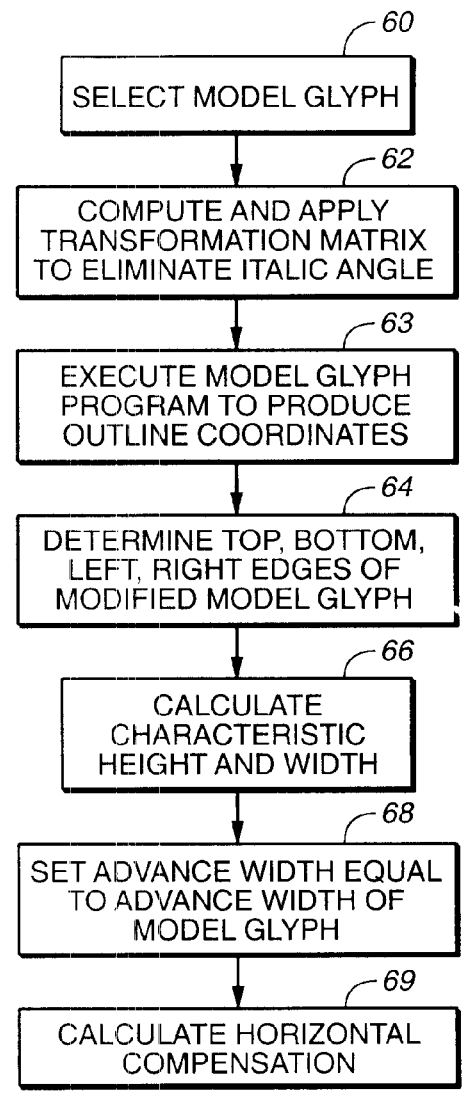
FIG._5
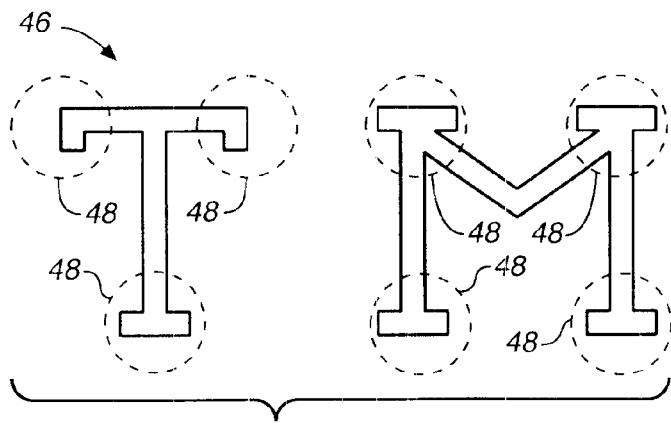
FIG._4
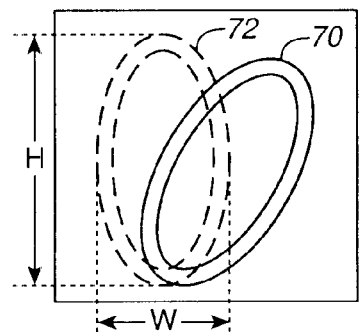
FIG._6

20 → 12700 0$0£0  / FranklinGothic-Heavy
20 → 12700 0$0£0  / FranklinGothic-Book
20 → *12700 0$0£0*  / *FranklinGothic-BookOblique*
20 → 12700 0$0£0  / NewCenturySchlbk-Roman
20 → 12700 0$0£0  / NewCenturySchlbk-Bold
20 → *12700 0$0£0*  / *NewCenturySchlbk-Italic*
FIG._1B
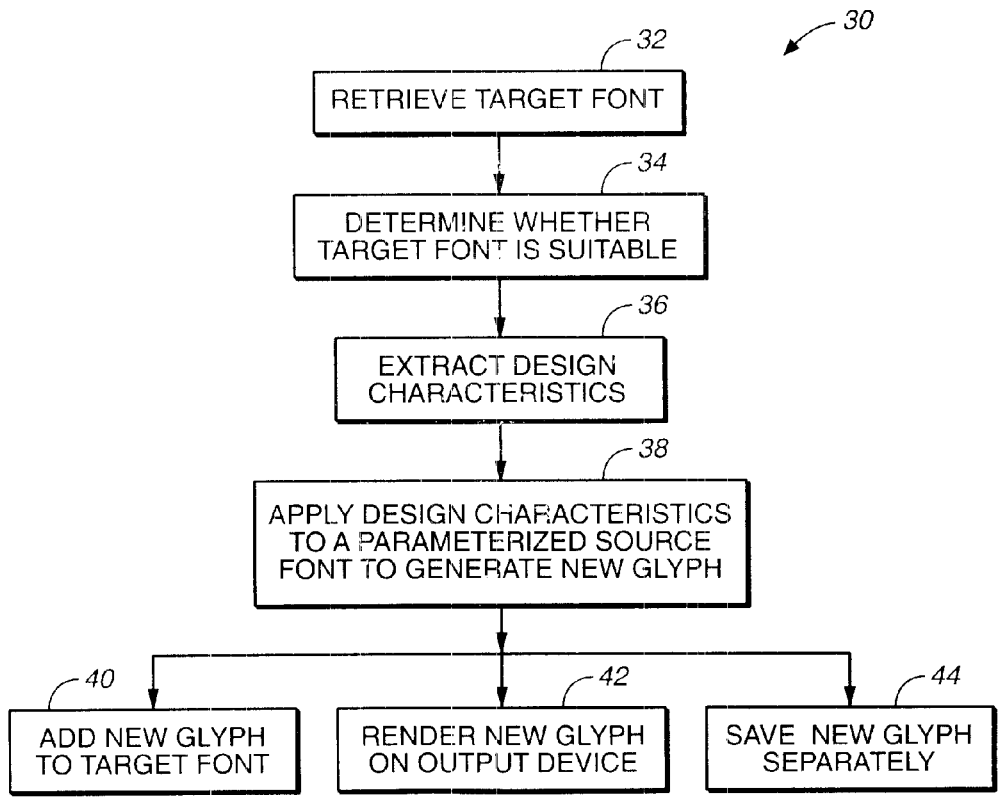
FIG._2

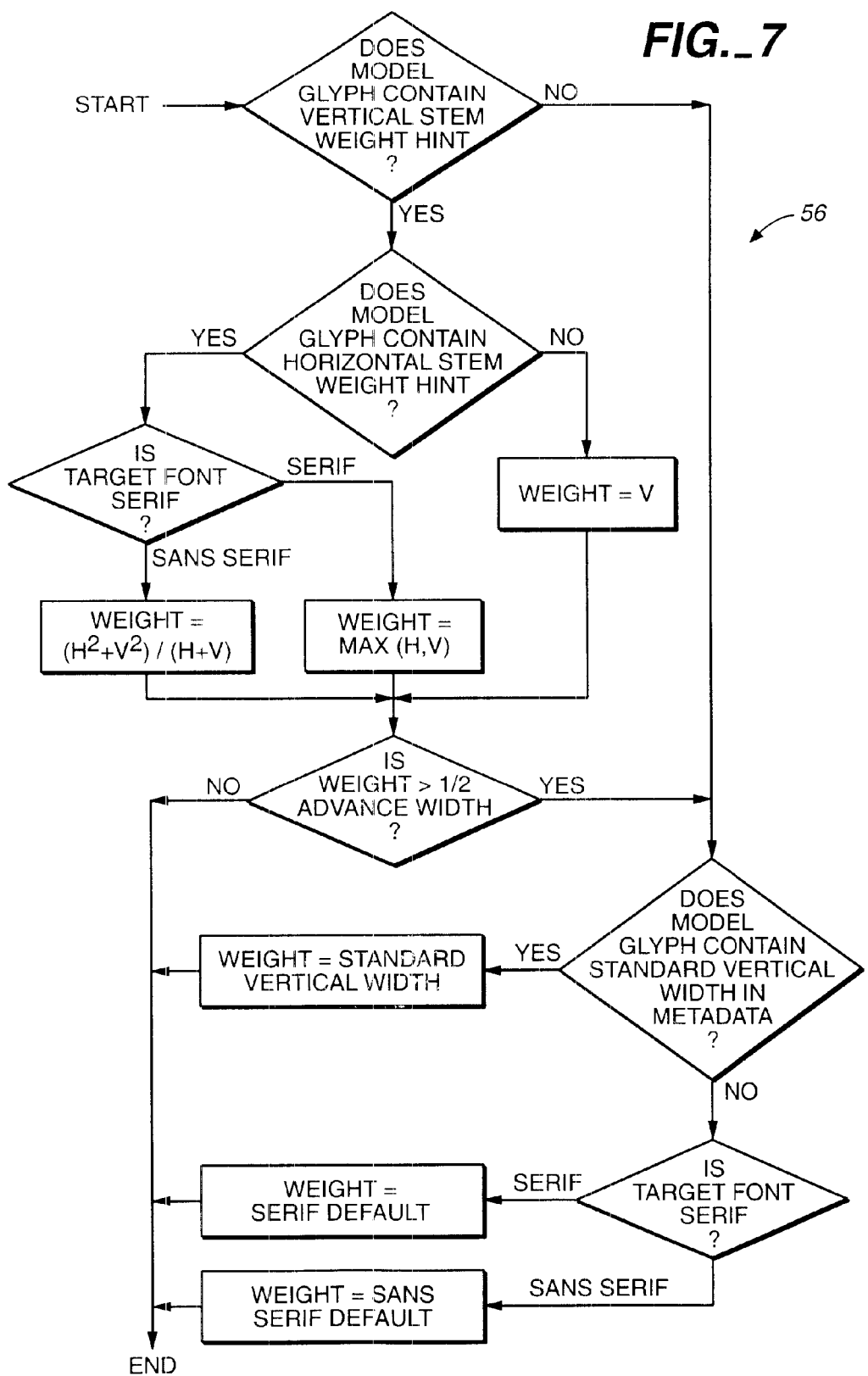
FIG._7

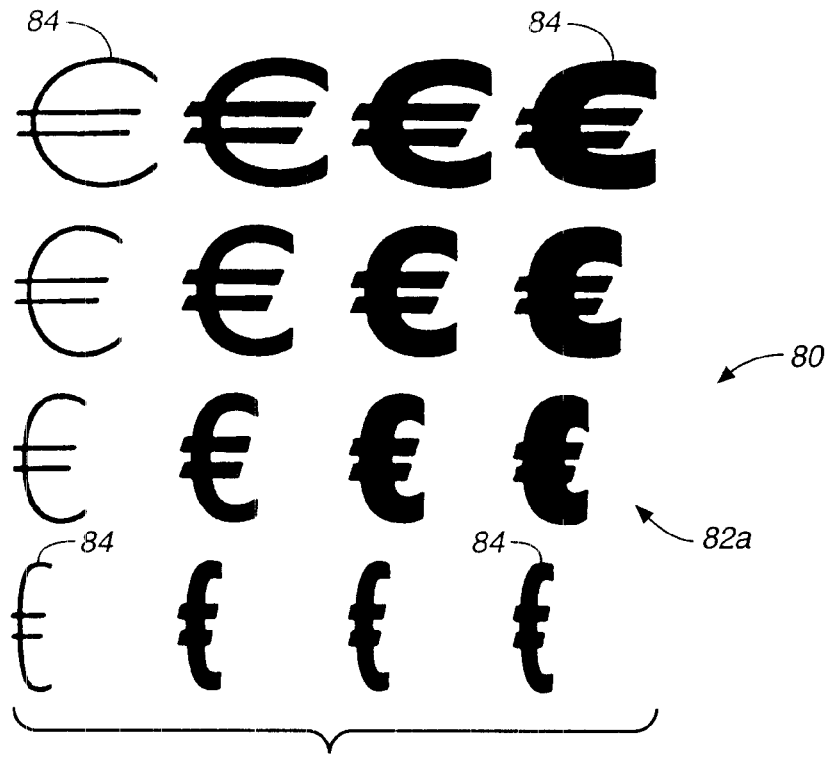
FIG._8A
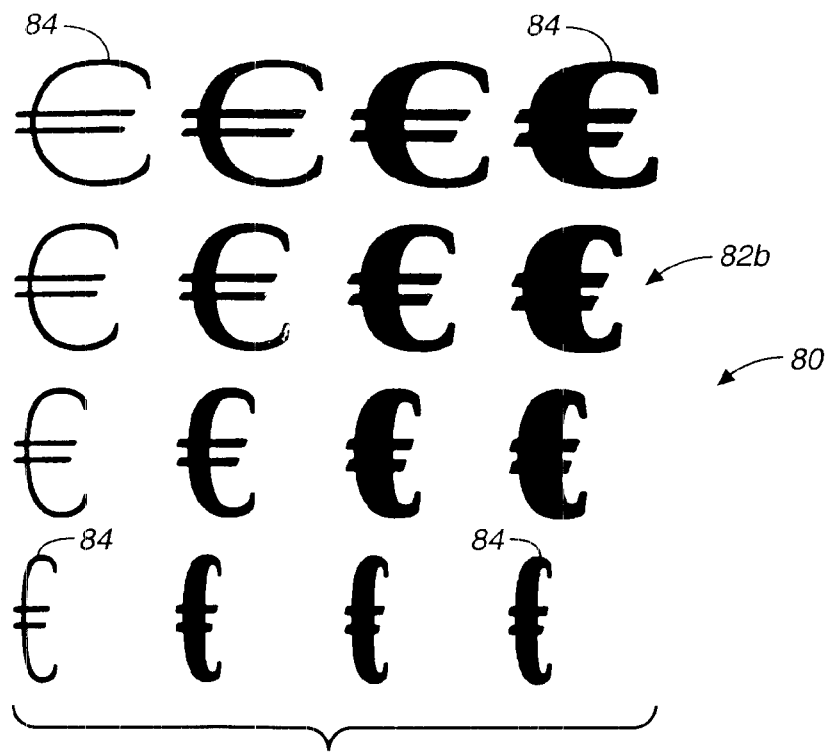
FIG._8B

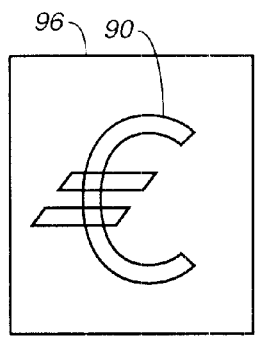
*FIG._9A*
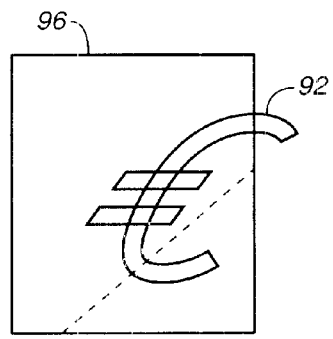
*FIG._9B*
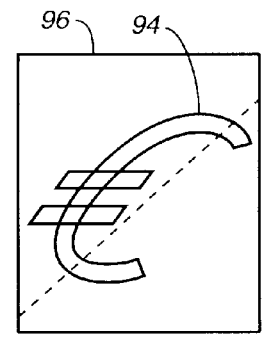
*FIG._9C*
*FIG._10*

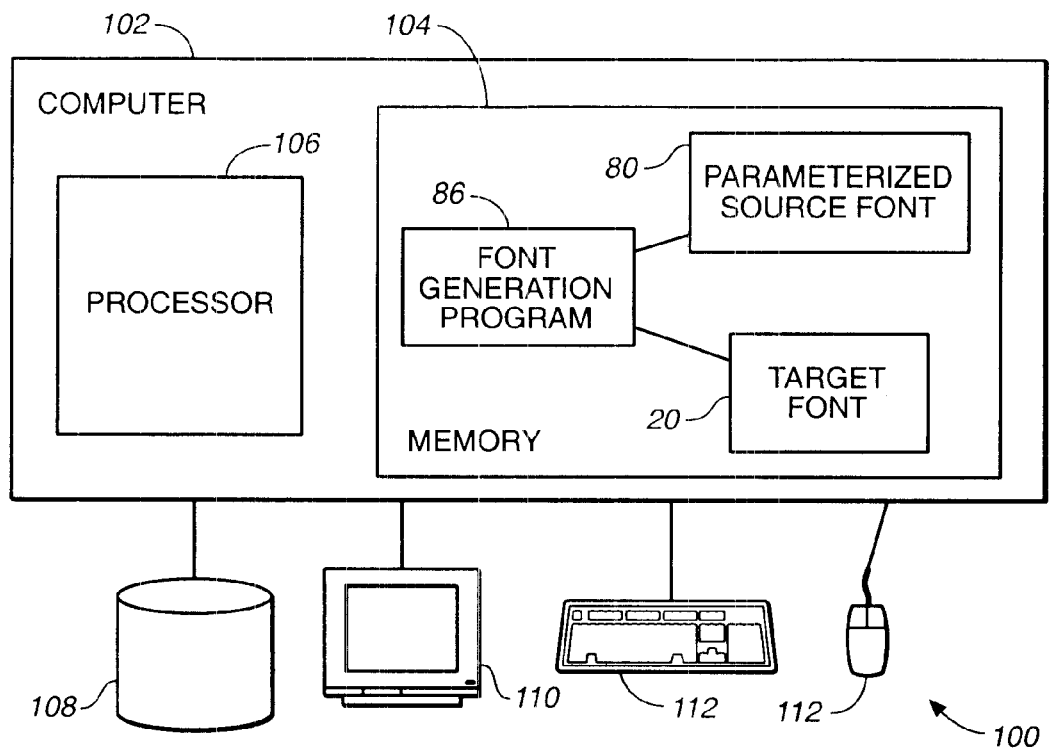
FIG._11

GENERATING A GLYPH

BACKGROUND

The present invention relates to a method of generating a glyph, and more particularly to a method of generating a new glyph in the style of an existing font, and rendering it, storing it, or adding it to the existing font.

A "character" refers to the general concept of a letter, number, symbol, ideograph or the like, without reference to a particular font, whereas a "glyph" refers to a specific instance of a character in a font, although these terms are sometimes used interchangeably. A collection of related fonts, e.g., with different weights or point sizes, can be referred to as a "typeface". Digital typefaces and fonts, such as the PostScript® products available from Adobe Systems Incorporated of San Jose, Calif., generally include instructions for rendering glyphs on an output device, such as a printer or monitor.

With the introduction of a common currency in Europe, a new typographic symbol is needed to represent the new common European currency, the "Euro". Unfortunately, most existing fonts do not include a "Euro" character. One approach to fixing this problem is for font foundries to distribute new fonts that contain a "Euro" character. However, this requires installation of the new font. Also, font foundries would need to create hundreds or even thousands of font-specific Euro glyphs to match the existing fonts. Consequently, the font foundries may not update all the digital fonts regularly accessed by a user. Therefore, the user may need to arrange for an existing font to be manually edited using a font editing program, such as Fontographer™, available from Macromedia, to add the "Euro" glyph. Unfortunately, this is time consuming and requires special skills the user may not possess, and is expensive if a font progammer must be hired.

Another problem is the rendering of unusual characters "on the fly", i.e., generally in real time as a data stream is passed to an output device. For example, some characters, such as Greek letters, are used infrequently and are not included in many fonts. As a result, an unusual character may be rendered with a glyph from another font, or may simply be represented by a place-holder symbol. At best, the output device displays a glyph that does not fit esthetically with the other glyphs in the font.

SUMMARY

In general, in one aspect, the invention is directed to a computer-implemented method of generating a glyph. A plurality of design characteristics are extracted from a target font and a source glyph program is generated using the design characteristics. The source glyph program defines a new glyph that is stylistically similar to glyphs of the target font, and the new glyph corresponds to a first character that is not present in the target font.

Implementations of the invention may include one or more of the following. Generating the source glyph program may include applying at least some of the design characteristics to a parameterized source font. The parameterized source font may include a plurality of master glyphs each representing the first character. Generating the source glyph program may include interpolating the master glyphs, and the relative contribution of the master glyphs may be determined from the design characteristics. One of the parameters of the source font may be whether it is serif or sans serif. The parameterized source font may include a plurality of design axes, e.g., weight and width. The parameterized source font may create a source glyph program that defines the new glyph so that it matches the weight, width and serif style of the target font. Generating the source glyph program may include modifying the source glyph program provided by the parameterized source font. The source glyph program may be modified so that the new glyph would match the italic angle, vertical position and horizontal compensation of the target font. The new glyph may be added to the target font, it may be rendered on an output device, or it may be saved separately from the target font.

The method may determine whether the target font is suitable for modification, e.g., by detecting whether the target font already includes the first character. Extracting the plurality of design characteristics may include selecting a model glyph from the target font representing a second character. The second character may have typographic properties similar to the first character to be added to the target font. Design characteristics may be derived from metadata stored in the target font, e.g., italic angle and stem width, from an outline stored in the model glyph, e.g., a height and a width. Design characteristics, such as whether the target font is a serif font, may be derived from a size of the program to generate the model glyph. The second character may be a "trademark" (™) character. The first character may be a "euro" character, and the second character may be a "zero" character.

A first transformation may be applied to the model glyph to substantially eliminate an italic angle prior to extracting the plurality of design characteristics. A second transformation may be applied to the new glyph so that it has the same italic angle as the target font. A horizontal compensation may be applied to shift the new glyph to match the horizontal compensation of the target font. The new glyph may be scaled vertically to match the height of the model glyph and shifted vertically to match the vertical position of the model glyph.

In another aspect, the invention is directed to a computer-implemented method of modifying a target font. A plurality of design characteristics are extracted from the target font, a source glyph program is generated using the design characteristics, and the source glyph is added to the target font. The source glyph program defines a new glyph that is stylistically similar to glyphs of the target font, and the new glyph corresponds to a first character that is not present in the target font.

In another aspect, the invention is directed to a computer-implemented method of displaying a glyph. A plurality of design characteristics are extracted from a target font, a source glyph program is generated using the design characteristics, and the source glyph is rendered on an output device. The source glyph program defines a new glyph that is stylistically similar to glyphs of the target font, and the new glyph corresponds to a first character that is not present in the target font. The output device may be a printer or a monitor.

In another aspect, the invention is directed to a computer-implemented method of generating a glyph. A character that is not present in a target font is identified, a style of the target font is determined, a glyph that corresponds to the character is received, and the glyph is modified to match the style of the target font. The glyph may be added to the target font or rendered on an output device.

In another aspect, the invention is directed to a computer-implemented method of modifying a font. At least one selected if glyph from an existing font that does not contain a Euro glyph is analyzed, an outline of a Euro glyph that appears in style similar to the selected glyph is generated, and the outline of the Euro glyph is modified so that it appears closer in style to the selected glyph. The modified outline of the Euro glyph is added to the font so that an application can render the Euro glyph in a style that is not distinguishable from the style of the glyphs originally present in the font.

In another aspect, the invention is directed to a method of determining whether a font is a serif or sans serif font. A glyph program that represents a character having a number of potential locations for serifs is selected, the size of the glyph program is determined, the size of the glyph program is used to indicate whether the is a serif or sans serif font.

Implementations of the invention may include one or more of the following. The font may be indicated as a serif font if the size of the glyph program exceeds a predetermined value. The character may be a trademark.

In another aspect, the invention is directed to a method of determining a characteristic weight for a font. A glyph program is selected from the font, a stem weight, if present, is extracted from a hint in the glyph program, and the characteristic weight is calculated from the stem weight hint. If the glyph program does not contain a stem weight hint, a standard vertical width, if present, is extracted from metadata in the target font, and the characteristic weight is determined from the standard vertical width. If the glyph program does not contain a stem weight or standard vertical width, the characteristic weight is determined from a default value.

Implementations of the invention may include one or more of the following. Both a vertical stem weight V and a horizontal stem weight H may be extracted, in which case the characteristic weight W may be calculated as $W=(H^2+V^2)/(H+V)$ if the font is identified as a sans serif font or as $W=\max(H, V)$ if the font is identified as a serif font. A vertical stem weight may be extracted, in which case the characteristic weight may be equal to the vertical stem weight. The method may determine whether the characteristic weight calculated from the stem weight hint exceeds a predetermined fraction of the advance width.

Advantages of the invention include the following. New glyphs that are not part of an existing font can be generated automatically. The new glyph can be added to an existing font quickly and easily while maintaining high fidelity to the style of the existing font. Unusual or new glyphs that conform to the style of an existing font can be generated on the fly.

BRIEF DESCRIPTION OF THE DRAWINGS

FIG. 1A is a line drawing of a Euro glyph.

FIG. 1B is an illustration of several unmodified fonts that do not include a Euro character.

FIG. 2 is a flow diagram of a method of generating a glyph according to the present invention.

FIG. 3 is a flow diagram of the step from the flow diagram FIG. 2 of extracting design characteristics.

FIG. 4 is a drawing of a trademark character showing suitable locations for serifs.

FIG. 5 is a flow diagram of the step from the flow diagram of FIG. 3 of determining the characteristic height, width, advance width, and horizontal offset.

FIG. 6 is a schematic illustration of the method of reducing the italic angle of a model glyph.

FIG. 7 is a flow diagram of the step from the flow diagram of FIG. 3 of determining a characteristic weight.

FIGS. 8A and 8B are schematic illustrations of a single glyph in sans serif and serif parameterized typefaces, respectively.

FIGS. 9A–9C are schematic illustrations of the method of restoring an italic angle and a horizontal offset to a source glyph.

FIG. 10 is an illustration of several fonts modified according to the method of the present invention.

FIG. 11 is a schematic diagram of a computer system which may be used to carry out the present invention.

DETAILED DESCRIPTION

In brief, the invention is a computer-implemented method of adding a glyph that represents a new character to an existing font, or rendering a glyph that represents a new character, in the style of an existing font. In this application, a "character" is a letter, number, symbol, ideograph or the like, without reference to a particular font, whereas a "glyph" is a particular instance of a character. The term "glyph" can also refer to the portion of a font program used to generate an instance of a character.

A program implementing the invention can analyze selected glyph or glyphs in an existing font that does not contain a Euro glyph, generate and modify an outline of the Euro glyph so that it appears in style similar to the selected glyph or glyphs in the existing font, and add the Euro glyph to the font so that an application can render the Euro glyph in a style that is not distinguishable from the style of the glyphs originally present in the existing font. The program can function automatically, without user feedback or interaction.

As noted above, it is occasionally necessary to generate new glyphs that are not part of an existing font. To be aesthetically pleasing, the glyph representing the new character should mimic the style of the other glyphs in the existing font. One character that currently needs to be added to existing fonts is the "Euro". FIG. 1A shows a line drawing of a Euro glyph 10. As shown, the glyph includes a "C"-shaped curve 12, and two horizontal lines 14 and 16. Other graphic elements, such as vertical and diagonal lines, dots, and more complex elements, may be used to generate other glyphs. FIG. 1B shows selected glyphs from several existing fonts 20 from typefaces, such as Franklin Gothic and New Century Schoolbook, that previously did not include a Euro character.

FIG. 2 illustrates a computer implemented method 30 of generating a new glyph in the style of an existing font. The method is performed by a glyph-generating computer program that may be implemented in hardware, firmware, software, or combinations thereof, and the program can be tangibly embodied in any sort of computer readable storage device, such as volatile and non-volatile memory, including semiconductor memory devices, magnetic disks, magneto-optical disks, and optical disks. The method can be performed in different devices, such as computers or printers, and in different types of computer programs, such as operating systems, applications, or printer drivers.

The method begins with retrieval of a target font into the memory of a device, such as a computer (step 32). The target font is an existing font program having a style which the glyph generating program will attempt to copy when generating a new glyph. The method determines whether the target font is suitable for modification or copying (step 34). Assuming the target font is suitable for modification, the glyph generating program extracts design characteristics from the target font (step 36). Once the design characteristics are determined, they are used to generate a new glyph representing the new character from a parameterized source font (step 38). Finally, the new glyph is added to the target font (step 40). Alternately, the new glyph could be rendered "on the fly" on an output device, such as a printer or display (step 42), with or without adding the new glyph to the target font. Also, the new glyph can be saved for future use, e.g., separately from the target font (step 44). These steps will be described in further detail below.

In step 32, the target font is retrieved from a storage device into memory. During or after retrieval, the font may be converted from one format into another for ease of processing. Once the target font is retrieved, it is deconstructed into constituent elements for later analysis. This deconstruction is a process known in the art, and is performed, for example, by the Fontographer™ font editing program from Macromedia.

In step 34, the glyph generating program determines whether the target font is suitable for modification. A first possible selection criterion is whether the character is already part of the target font. A second possible selection criterion is whether the character to be added would be useful in combination with other characters in the target font. A third possible selection criterion is whether the program is capable of generating a glyph that matches the style of the target font with a high degree of fidelity. These selection criteria may apply whether a new glyph is to be added to the target font, stored, or rendered to an output device.

In one implementation, the glyph generating program generates a list of the names of all the glyphs in the target font. The program checks the list to determine whether the target font already has a glyph equivalent to the glyph to be added, e.g., a glyph named "Euro" or "uni20AC". In addition, the program determines whether the target font includes numbers, e.g., a glyph named "zero" or "zerooldstyle", and currency symbols, e.g., a glyph named "dollar", "dollaroldstyle" or "sterling". It is assumed that a glyph for the Euro character need not be added to a target font that does not include both numbers and other currency symbols.

Other selection criteria can be applied to reject target fonts that the glyph generating program cannot generate with fidelity. For example, if the program cannot generate shadowed or outlined glyphs, it could decide not to add the glyph if the target font is a shadowed or outlined font.

Assuming the target font is suitable for modification or copying, the program extracts design characteristics from the target font in step 36. The design characteristics can be extracted from one or more of font-level metadata, from glyph-level data, from hints in the glyph, or from the instructions that describe the shape of the glyph itself, e.g., an outline. As shown in FIG. 3, in one implementation, the program determines whether the font is serif or sans serif (step 50), extracts an italic angle (step 52), determines a characteristic weight (step 54), and calculates a characteristic height, a characteristic width, an advance width, and a horizontal compensation (step 56). Other design characteristics that can be extracted include general design parameters, such as whether the glyph is from a script font, an inline or outline font, or a rough-edged font. More specific details, such as shape length and thickness of serifs, angle of stress, and contrast between vertical and horizontal strokes, can also be used as design characteristics.

To determine whether the font is a serif or sans serif font in step 50, the complexity of one or more model glyphs may be measured. The model glyph or glyphs are selected based on glyphs that provide a large number (relative to other glyphs in the target font) of potential locations for serifs. Specifically, referring to FIG. 4, the trademark glyph "™" 46 includes about seven locations 48 where serifs could be placed, and thus provides a good sample for the font complexity. The complexity is measured by determining the size, e.g., the number of bytes, of the target font program used to generate the model glyph. If the size is greater than a predetermined cutoff value, the glyph generating program infers that the font is a serif font. Otherwise, the glyph generating program infers that the font is a sans serif font. The cutoff value will have different values for different model glyphs and different font formats, and therefore is determined heuristically. A cutoff value of 118 bytes has good accuracy where the model glyph is a trademark and the font is stored as a Postscript® Type 2 font program. If the target font does not include the model glyph, the program assumes that the target font is a serif font by default.

To determine the italic angle in step 52, the italic angle is extracted from the font-level metadata. The program also determines whether the font is a synthetic italic by checking for a skew in the font matrix. If the font is not italic, this fact is noted for later use in generation of the new glyph.

The process for determining the characteristic width, height, advance width, and horizontal compensation is shown in more detail in FIG. 5. First, the program selects a second model glyph or glyphs for inspection (step 60). This second model glyph represents a character that is typographically similar to the character to be added to the target font. For example, if the "Euro" character is to be added to the target font, the model glyph can be the "zero" or "zerooldstyle" character, since both have a similar shape to the Euro.

In one implementation, the model glyphs are designated by the programmer, and the selection is performed automatically by the program. Alternatively, the model glyphs can be selected based on user feedback and interaction. Glyphs can be selected from the source and target fonts by, for example, glyph name, glyph identifier or encoding.

Assuming the target font is a designed rather than a synthetic italic, the program computes a transformation matrix which will eliminate the italic angle when applied to the model glyph's outline coordinates (step 62). As shown in FIG. 6, the transformation is applied to shear the model glyph 70 upright to create a modified glyph 72. If the target is a synthetic italic, then the model glyph will not require transformation, because it is already stored in a non-italic form.

The program executes the model glyph font program, producing outline coordinates (step 63), and then determines the coordinates of the left, bottom, right and top edges of the resulting model glyph (step 64). A characteristic height H of the target font is calculated from the difference between the top and bottom edge coordinates of the modified model glyph, and a characteristic width W of the target font is calculated from the difference between the left and right edge coordinates of the modified model glyph (step 66). The characteristic advance width may be set equal to the advance width of the model glyph (step 68). The horizontal offset is calculated from the following equation (step 69):

$$LE-(AW-RE)$$

where LE is the horizontal coordinate of the left edge, AW is the advance width, and RE is the horizontal coordinate of the right edge.

The method of determining a characteristic weight of the target font in step 56 is shown by FIG. 7. In brief, the weight may be derived from hints in the model glyph, from metadata in the target font, from data in the model glyph, or from a default value. If the model glyph includes hints, the master vertical and/or horizontal stem weights are extracted from the hints. If the glyph does not include hints, then the program searches for metadata for a "standard vertical width", and uses the standard vertical width as the characteristic weight. If the glyph does not include a vertical standard width key, then the program uses default values, such as a first default value, e.g., 0.100 ems, if the font is identified as a serif and a second default value, e.g., 0.068 ems, if the font is identified as sans serif.

Assuming that both a vertical stem weight and a horizontal stem weight are retrieved from the hints, the characteristic weight is determined from the these stem weights. Specifically, if the model font is identified as a serif font, then the larger of the vertical or horizontal stem weight is used as the characteristic weight. On the other hand, if the model font is identified as a sans serif font, then a weighted average of the vertical and horizontal stem weights is used as the characteristic weight. The weighted average can be calculated from the following expression:

$$(V^2+H^2)/(V+H)$$

where V is the vertical stem weight and H is the horizontal stem weight. If only a vertical stem weight is retrieved from the hints, then the vertical stem weight is used as the characteristic weight. If there are no hints, or if only a horizontal stem weight is retrieved from the hints, then the program proceeds to searches for vertical stem width metadata. In addition, at each calculation of a proposed characteristic weight, the program checks to ensure that the weight is reasonable. If the characteristic weight is greater than one-half of the characteristic width, then the next available procedure is used to determine the characteristic weight.

Once the design characteristics have been extracted from the target font, the design characteristics are applied to a parameterized source font in step 38 to generate a source glyph program, i.e., an instance of the glyph. The parameterized source font permits the generation of a glyph with a style which depends on the applied parameters. The parameterized source font contains only the characters that are to be added or rendered, e.g., just the Euro character. Examples of parameterized source fonts include multiple masters, True Type variations, and Chameleon font technology as described in U.S. Pat. No. 5,664,086, incorporated herein by reference.

FIGS. 8A and 8B show two parameterized source fonts implemented using multiple master technology. FIG. 8A shows a sans serif multiple master font 82a, whereas FIG. 8B shows a serif multiple master font 82b. Each multiple master font includes two design axes: a weight axis (shown along the horizontal axis) and a width axis (shown along the vertical axis). For each character, a multiple master font includes one master glyph 84 for each end of each design axis. Thus, the various master glyphs 84 identify the extreme variations that are available for an instance of the character. A multiple master font can also include master glyphs at intermediate points along the design axes. Two to sixteen master glyphs may be used to provide a sufficient range of stylistic variation. An instance of a character may be constructed by interpolating the master glyphs.

To generate the source glyph program that defines the new glyph, one of the multiple master fonts is selected based on whether the target font is a serif or sans serif font (as previously determined in step 50). If necessary, the desired new character is selected from the available characters in the parameterized source font. A conventional interpolation procedure, such as vector dot product or image morphing, is used to generate a new instance of the glyph from the master glyphs. The relative contribution of each master glyph is determined according to the extracted design characteristics corresponding to the axes of the multiple master source font, i.e., the characteristic weight and width previously determined in steps 54 and 56.

Referring to FIGS. 9A and 9B, once a source glyph program is generated, the source glyph program is further modified to more closely match the style of the target font. Specifically, a transformation matrix is applied to the new glyph instance 90 to generate a skewed new glyph 92 with the same italic angle as the target font. Assuming the target font is a "designed" italic, rather than a synthetic italic, the transformation matrix applied to the new glyph is the inverse of the transformation matrix applied to the model glyph.

Referring to FIGS. 9B and 9C, once the source glyph has been skewed, its horizontal position is adjusted to generate a shifted source glyph 94. The shifted source glyph 94 has the same horizontal compensation as other glyphs in the target font. Specifically, the horizontal offset determined in step 56 is added to each horizontal coordinate in the new glyph. This should shift the new glyph so that it is positioned with respect to bounding box 96 in a similar manner to other glyphs in the target font.

Finally, the vertical position of the new glyph is adjusted to match the model glyph from the target font. Specifically, the new glyph is vertically scaled to match the characteristic height, and the new glyph is then verically'shifted so that its top and bottom align with the top and bottom of the model glyph.

While it is easiest to describe the above transformational steps as separate operations, they can be combined as a single operation when actually applied in the program.

Once the source glyph program has been generated and modified, in step 40 the source glyph program is added to the target font to create a modified font. FIG. 10 illustrates a set of selected glyphs from several modified fonts 20', including Franklin Gothic and New Century Schoolbook, that now include a Euro glyph. Instead of, or in addition to, adding the new glyph to a target font, the new glyph can be rendered and displayed in step 42. For example, the new glyph can be generated "on the fly" in the data stream from a computer to a printer.

If the target font is a multiple master font, the process of generating a source glyph program is iterated for each master, combining the results to produce a new multiple master glyph.

Of course, multiple glyph programs could be generated by the glyph generating program and added to the target font at the same time.

Referring to FIG. 11, the method of the present invention may be implemented with a memory 104 and a microprocessor 106. The memory and microprocessor may be components of a general-purpose computer 102 of conventional construction in a computer system 100. The computer system 100 may also include a mass storage device 108, an output device 110, such as a display screen, laser printer print engine, photo typesetter, or laser film recorder, and an input-device 112, such as a keyboard or mouse. The microprocessor 106 is controlled by a glyph generating program 116 stored in memory 104. The glyph generating program 116 has access to the target font program 20 and the parameterized source font 80.

It should be realized that the glyph generating program, parameterized source font and target font need not reside in the same computer or hardware device. For example, the components used in the method can be distributed across a computer network. In addition, the processor and memory may be embedded in a peripheral device, such as a PostScript® laser printer.

What is claimed is:

1. A computer-implemented method of generating a glyph, comprising:
    extracting a plurality of design characteristics from a target font; and
    generating a source glyph program using the design characteristics, the source glyph program defining a new glyph that is stylistically similar to glyphs of the target font, the new glyph corresponding to a first character that is not present in the target font,
    wherein the first character is a "Euro" character.

2. The method of claim 1, wherein generating the source glyph program includes applying at least some of the design characteristics to a parameterized source font.

3. The method of claim 2, wherein the parameterized source font includes a plurality of master glyphs each representing the first character.

4. The method of claim 3, wherein generating the source glyph program includes interpolating the master glyphs, and the relative contribution of the master glyphs is determined from the design characteristics.

5. The method of claim 2, wherein one of the parameters of the source font is serif or sans serif.

6. The method of claim 2, wherein the parameterized source font includes a plurality of design axes.

7. The method of claim 6, wherein weight is one of the design axes.

8. The method of claim 6, wherein width is one of the design axes.

9. The method of claim 2, wherein applying at least some of the design characteristics to the parameterized source font creates a source glyph program defining that defines the new glyph so that it matches the weight, width and serif style of the target font.

10. The method of claim 2, wherein generating the source glyph program includes modifying the source glyph program provided by the parameterized source font.

11. The method of claim 10, wherein the source glyph program is modified so that the new glyph matches the italic angle of the target font.

12. The method of claim 10, wherein the source glyph program is modified so that the new glyph matches the horizontal compensation of the target font.

13. The method of claim 10, wherein the source glyph program is modified so that the new glyph matches the vertical position of the target font.

14. The method of claim 1, wherein generating the source glyph program includes modifying an existing source glyph program.

15. The method of claim 1, further comprising rendering the new glyph on an output device.

16. The method of claim 1, further comprising saving the new glyph separately from the target font.

17. The method of claim 1, further comprising determining whether the target font is suitable for modification.

18. The method of claim 17, wherein the determining step includes detecting whether the target font already includes the first character.

19. The method of claim 1, wherein extracting the plurality of design characteristics includes selecting a model glyph from the target font representing a second character.

20. The method of claim 19, wherein the second character has typographic properties similar to the first character to be added to the target font.

21. The method of claim 19, wherein at least one of the design characteristics is derived from metadata stored in the target font.

22. The method of claim 21, wherein the metadata includes an italic angle.

23. The method of claim 21, wherein the metadata includes a stem width.

24. The method of claim 19, wherein extracting the design characteristics includes deriving at least one design characteristic from an outline stored in the model glyph.

25. The method of claim 24, wherein the at least one design characteristic derived from the outline include a height and a width.

26. The method of claim 19, wherein extracting the design characteristics includes deriving at least one design characteristic from a size of the program to generate the model glyph.

27. The method of claim 26, wherein the at least one design characteristic derived from the size of the program to generate the model glyph includes whether the target font is a serif font.

28. The method of claim 27, wherein the second character is a Atrademark@ (J) character.

29. The method of claim 19, further comprising applying a first transformation to the model glyph to substantially eliminate an italic angle prior to extracting the plurality of design characteristics.

30. The method of claim 29, further comprising applying a second transformation to the new glyph so that it has the same italic angle as the target font.

31. The method of claim 29, further comprising applying a horizontal compensation to shift the new glyph to match the horizontal compensation of the target glyph.

32. The method of claim 29, further comprising scaling the new glyph vertically to match the height of the model glyph and shifting the new glyph vertically to match the vertical position of the model glyph.

33. The method of claim 1, further comprising adding the new glyph to the target font.

34. A computer-implemented method of displaying a glyph, comprising:
    extracting a plurality of design characteristics from a target font;
    generating a source glyph program using the design characteristics, the source glyph program defining a new glyph that is stylistically similar to glyphs of the target font, the new glyph corresponding to a first character that is not present in the target font; and
    rendering the source glyph on an output device,
    wherein the first character is a "Euro" character.

35. The method of claim 34, wherein the output device is a printer.

36. The method of claim 34, wherein the output device is a monitor.

37. A computer-implemented method of modifying a font, comprising:
    analyzing at least one selected glyph from an existing font that does not contain a Euro glyph;
    generating an outline of a Euro glyph that appears in style similar to the selected glyph;
    modifying the outline of the Euro glyph so that it appears closer in style to the selected glyph; and
    adding the modified outline of the Euro glyph to the font so that an application can render the Euro glyph in a style that is not distinguishable from the style of the glyphs originally present in the font.

38. A method of determining a characteristic weight for a font, comprising:

selecting a glyph program from the font;

extracting a stem weight, if present, from a hint in the glyph program and calculating the characteristic weight from the stem weight hint;

if the glyph program does not contain a stem weight, extracting a standard vertical width, if present, from metadata in the glyph program and calculating the characteristic weight from the standard vertical width; and if the glyph program does not contain a stem weight or standard vertical width, calculating the characteristic weight from a default value.

39. The method of claim 38, wherein extracting a stem weight includes extracting a vertical stem weight V and a horizontal stem weight H.

40. The method of claim 39, wherein the characteristic weight W is calculated as $W=(H2+V2)/(H+V)$ if the font is identified as a sans serif font.

41. The method of claim 39, wherein the characteristic weight W is calculated as $W=\max(H, V)$ if the font is identified as a serif font.

42. The method of claim 39, wherein extracting a stem weight includes extracting a vertical stem weight and the characteristic weight is equal to the vertical stem weight.

43. The method of claim 38, further comprising determining whether the characteristic weight calculated from the stem weight hint exceeds a predetermined fraction of the advance width.

44. A computer-implemented method of modifying a font, comprising:

analyzing at least one selected glyph from an existing font that does not contain a glyph for a new character;

generating an outline of a new glyph that corresponds to the new character;

modifying the outline of the new glyph so that it appears closer in style to the selected glyph; and adding the modified outline of the new glyph to the font so that an application can render the new glyph in a style that is not distinguishable from the style of the glyphs originally present in the font.

45. A computer program product, tangibly stored on a computer-readable medium, for modifying a font, comprising instructions operable to cause a programmable processor to:

extract a plurality of design characteristics from a target font;

generate a source glyph program using the design characteristics, the source glyph program defining a new glyph that is stylistically similar to glyphs of the target font, the new glyph corresponding to a first character that is not present in the target font, wherein the first character is a "Euro" character.

46. The product of claim 45, wherein generating the source glyph program includes applying at least some of the design characteristics to a parameterized source font.

47. The product of claim 46, wherein the parameterized source font includes a plurality of master glyphs each representing the first character.

48. The product of claim 47, wherein generating the source glyph program includes interpolating the master glyphs, and the relative contribution of the master glyphs is determined from the design characteristics.

49. The product of claim 46, wherein one of the parameters of the source font is serif or sans serif.

50. The product of claim 46, wherein the parameterized source font includes a plurality of design axes.

51. The product of claim 50, wherein weight is one of the design axes.

52. The product of claim 50, wherein width is one of the design axes.

53. The product of claim 46, wherein applying at least some of the design characteristics to the parameterized source font creates a source glyph program defining that defines the new glyph so that it matches the weight, width and serif style of the target font.

54. The product of claim 46, wherein generating the source glyph program includes modifying the source glyph program provided by the parameterized source font.

55. The product of claim 54, wherein the source glyph program is modified so that the new glyph matches the italic angle of the target font.

56. The product of claim 54, wherein the source glyph program is modified so that the new glyph matches the horizontal compensation of the target font.

57. The product of claim 54, wherein the source glyph program is modified so that the new glyph matches the vertical position of the target font.

58. The product of claim 45, wherein generating the source glyph program includes modifying an existing source glyph program.

59. The product of claim 45, further comprising instructions operable to cause a programmable processor to:

render the new glyph on an output device.

60. The product of claim 45, further comprising instructions operable to cause a programmable processor to:

save the new glyph separately from the target font.

61. The product of claim 45, further comprising instructions operable to cause a programmable processor to:

determine whether the target font is suitable for modification.

62. The product of claim 61, wherein the determining step includes detecting whether the target font already includes the first character.

63. The product of claim 45, wherein extracting the plurality of design characteristics includes selecting a model glyph from the target font representing a second character.

64. The product of claim 63, wherein the second character has typographic properties similar to the first character to be added to the target font.

65. The product of claim 63, wherein at least one of the design characteristics is derived from metadata stored in the target font.

66. The product of claim 65, wherein the metadata includes an italic angle.

67. The product of claim 65, wherein the metadata includes a stem width.

68. The product of claim 72, wherein extracting the design characteristics includes deriving at least one design characteristic from an outline stored in the model glyph.

69. The product of claim 63, wherein the at least one design characteristic derived from the outline include a height and a width.

70. The product of claim 68, wherein extracting the design characteristics includes deriving at least one design characteristic from a size of the program to generate the model glyph.

71. The product of claim 70, wherein the at least one design characteristic derived from the size of the program to generate the model glyph includes whether the target font is a serif font.

72. The product of claim 71, wherein the second character is a Atrademark@ (J) character.

73. The product of claim 63, further comprising instructions operable to cause a programmable processor to:

apply a first transformation to the model glyph to substantially eliminate an italic angle prior to extracting the plurality of design characteristics.

74. The product of claim 73, further comprising instructions operable to cause a programmable processor to:

apply a second transformation to the new glyph so that it has the same italic angle as the target font.

75. The product of claim 73, further comprising instructions operable to cause a programmable processor to:

apply a horizontal compensation to shift the new glyph to match the horizontal compensation of the target glyph.

76. The product of claim 73, further comprising instructions operable to cause a programmable processor to:

scale the new glyph vertically to match the height of the model glyph and shifting the new glyph vertically to match the vertical position of the model glyph.

77. The product of claim 45, further comprising instructions operable to cause a data processing apparatus to:

add the new glyph to the target font.

78. A computer program product, tangibly stored on a computer-readable medium, for modifying a font, comprising instructions operable to cause a programmable processor to:

extract a plurality of design characteristics from a target font;

generate a source glyph program using the design characteristics, the source glyph program defining a new glyph that is stylistically similar to glyphs of the target font, the new glyph corresponding to a first character that is not present in the target font; and render the source glyph on an output device, wherein the first character is a "Euro" character.

79. The product of claim 78, wherein the output device is a printer.

80. The product of claim 78, wherein the output device is a monitor.

81. A computer program product, tangibly stored on a computer-readable medium, for modifying a font, comprising instructions operable to cause a programmable processor to:

analyze at least one selected glyph from an existing font that does not contain a Euro glyph;

generate an outline of a Euro glyph that appears in style similar to the selected glyph;

modify the outline of the Euro glyph so that it appears closer in style to the selected glyph; and add the modified outline of the Euro glyph to the font so that an application can render the Euro glyph in a style that is not distinguishable from the style of the glyphs originally present in the font.

\* \* \* \* \*

UNITED STATES PATENT AND TRADEMARK OFFICE
CERTIFICATE OF CORRECTION

PATENT NO.         : 6,678,410 B1
APPLICATION NO. : 09/251700
DATED                  : January 13, 2004
INVENTOR(S)        : Thomas W. Phinney and Jeremy A. Hall Page 1 of 1

It is certified that error appears in the above-identified patent and that said Letters Patent is hereby corrected as shown below:

Column 10, Line 40 in Claim 33, replace:
"33. The method of Claim 1," with
--33. The method of Claim 40--

Column 12, Line 54 in Claim 68, replace:
"68. The product of Claim 72," with
--68. The product of Claim 63,--

Column 12, Line 57 in Claim 69, replace:
"69. The product of Claim 63," with
--69. The product of Claim 68,--

Column 12, Line 70 in Claim 70, replace:
"70. The product of Claim 68," with
--70. The product of Claim 63,--

Signed and Sealed this

Twenty-seventh Day of March, 2007

JON W. DUDAS
*Director of the United States Patent and Trademark Office*